United States Patent [19]
Espeel

[11] 3,837,615
[45] Sept. 24, 1974

[54] PROCESS AND DEVICE FOR THE CONTROL OF A MEMBRANE CHANNEL-VALVE

[75] Inventor: Frans Joris Espeel, Minneapolis, Minn.

[73] Assignee: Gebrueder Buehler AG, Uzwil, Switzerland

[22] Filed: Feb. 20, 1973

[21] Appl. No.: 334,062

[30] Foreign Application Priority Data
Feb. 20, 1972 Switzerland.................... 2834/72

[52] U.S. Cl................................. 251/29, 251/61.1
[51] Int. Cl............................................ F16k 31/165
[58] Field of Search .................. 251/29, 61.1; 137/1

[56] References Cited
UNITED STATES PATENTS
3,300,174   1/1967   Urban et al........................... 251/29

*Primary Examiner*—Henry T. Klinksiek
*Attorney, Agent, or Firm*—Merchant, Gould, Smith & Edell

[57] ABSTRACT

A membrane channel-valve is disclosed, having a switching membrane responsive to the pressure in a switching chamber therein to open or close a conduit to control gas flow between pressure medium intake and outflow connections. The channel-valve is controlled by a conversion valve forming a seal between a control medium intake line and a control medium output line so that when closed there is a static pressure in the intake line and when open there is a gas current flow through the intake line. A jet pump is provided having an exit opening in the control medium intake line and an entrance opening in the switching chamber of the channel-valve, to pressurize the switching chamber during static pressure conditions to close the channel-valve and to provide a low pressure therein during current flow conditions to open the channel-valve.

15 Claims, 3 Drawing Figures

3,837,615

PROCESS AND DEVICE FOR THE CONTROL OF A MEMBRANE CHANNEL-VALVE

BACKGROUND OF THE INVENTION

1. Field of the Invention: The invention refers to a procedure for the control of a membrane channel-valve with an accompanying membrane conversion valve controlled by impulses from a control pressure medium.

2. Description of the Prior Art and Summary of the Invention

The task of the invention is to significantly extend the possible uses of membrane channel-valves and especially to increase their switching speeds. A further task is to achieve control of membrane channel-valves by means of the pneumatic output sizes of wall-jet elements, also known as fluidics. Heretofore, this was hardly possible because the functional efficiency of wall-jet elements was considered stable with a water column of several hundred mm, while the behavior of previously known membrane elements is not stable at water columns of less than ca. 10,000 mm. For the rest, the use of membrane elements has the advantage that a considerable amplification function can be thereby achieved. For this reason, purely switching functions have heretofore been carried out by means of wall-jet elements. For actual performance functions, however, it is then necessary to convert to membrane elements. Previously, this has been done in several stages. Thereby, expenses become exceedingly great. Another familiar procedure is, for example, to construct membrane flip-flops or bistable multivibrators with four membrane elements. As is known, the bistable multivibrator, also called the flip-flop, is a favorite control element. It is therefore also a task of the invention to realize a significant simplification in connection with bistable multivibrators or flip-flops.

The invention-constituting procedure is characterized by the fact that a switching pressure medium is converted from a static pressure into a current by means of the membrane conversion valve and causes an excess pressure closing function against the pressure medium in the membrane channel-valve when there is static pressure while an inverse low pressure opening function supplementing the pressure medium in the membrane channel-valve is produced in the presence of a current.

In addition, the invention refers to a device for carrying out the procedure which has at least one membrane channel-valve for the pressure medium, preferably pressurized gas, with at least one switching membrane which is paired on the one hand with a membrane resting point between a pressure medium intake connection and a pressure medium outflow connection and, on the other hand, with a switching chamber. The device referred to also has a conversion valve, which can be a membrane conversion valve with at least one conversion membrane, accompanying and controlling the channel-valve, which conversion valve on the one hand forms a seal between a control medium intake and a control medium output and, on the other hand, closes off a control pressure chamber which has a control pressure line leading into it. This device according to the invention is characterized by the fact that a jet pump is located in a control medium line leading to the control medium intake and by the fact that an entrance opening is located in the switching chamber of each membrane channel-valve and is connected with the jet pump.

The invention also encompasses the fact that a second conversion membrane can be provided in the membrane conversion valve so as to form a control space in addition to the control pressure chamber and the fact that the control pressure line feeds into the control pressure chamber and a control line feeds into the control space.

In the control medium line it is possible to install a number of exit openings from a number of jet-pumps which are connected with a number of entrance openings which open into the switching chambers of a number of membrane channel-valves.

A number of additional membrane channel-valves can be connected with a control pressure chamber of the membrane channel-valve and the entrance opening of a jet-pump opening into it by means of pressure medium lines.

BRIEF DESCRIPTION OF THE DRAWINGS

The invention is illustrated by two models with the use of the included drawings, whereby.

Figure 1:
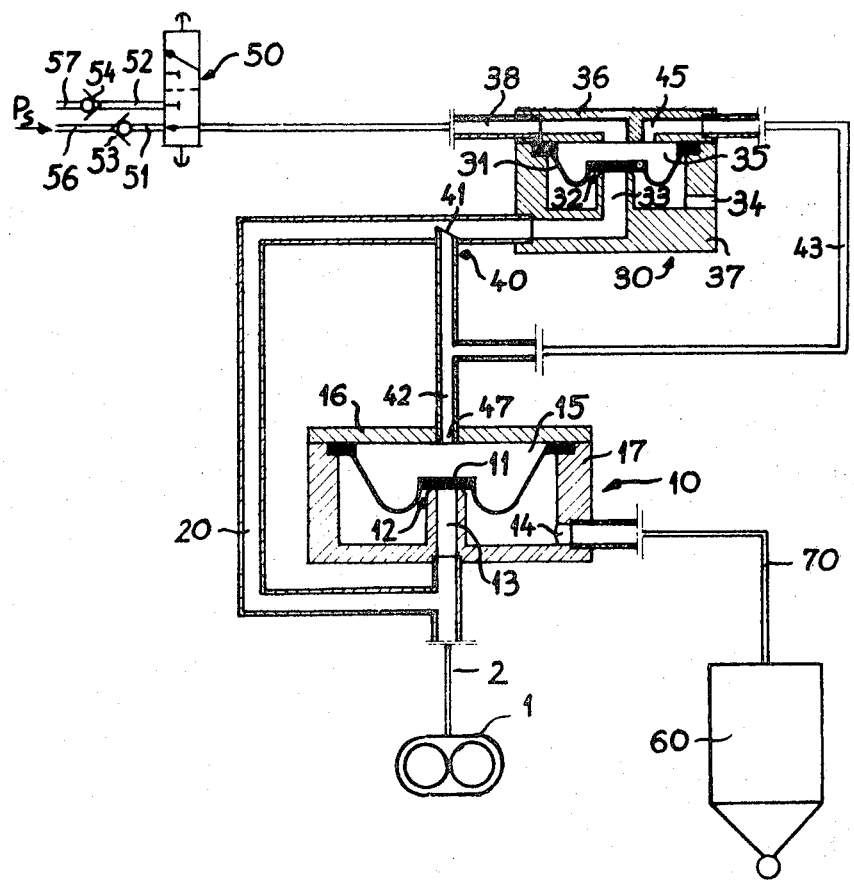
FIG. 1 shows the general switch of a first model with sectional views through a channel-valve and a membrane conversion valve, and whereby

A control medium line 20 is connected with the pressure generator 1 or the pressure medium line 2. This control medium line 20 leads to a membrane conversion valve 30. This membrane conversion valve 30 consists of a housing 37 which has a membrane 31, a control medium intake 33 and a control medium exhaust 34. Associated with the conversion membrane 31, there is a membrane seal 32 at the control medium intake 33. On the side of the conversion membrane 31 which faces away from the membrane seal 32 there is a control pressure chamber 35 defined by the conversion membrane and a closing lid 36. Through the closing lid 36 a control pressure line 38 feeds into the control pressure chamber 35. In the control medium line 20 a jet-pump 40 is installed such that its exit opening 41 is located in the control medium line 20. From the jet-pump 40 a tube 42 leads to an entrance opening 47 in the lid 16 of the membrane channel-valve 16 and opens into the switching chamber 15 of the valve. From the tube 42, an additional tube 43 branches off to an additional entrance opening 45 which is formed in the closing lid 36 of the membrane conversion valve 30 and feeds into the control pressure chamber 35. A bistable conversion device 50 connects to the control pressure tube 38 in the closing lid 36 of the conversion valve 30. Two tubes 51 and 52 with intervening check valves 53 and 54 lead to this bistable conversion device 50. A tube 56 leads to a control pressure source Ps. A tube 57 connected to the check valve 54 opens to the outside.

In the illustrated position of the membranes in the membrane channel-valve 10 and the conversion valve 30, the pressure generator 1 conveys pressure medium into the pressure medium supply connection 13 and through the control medium tube 20 into the control medium intake 33. At the same time this pressure medium also exerts an effect through the entrance opening 41 of the jet-pump 40 into the tube 42 and the entrance opening 47 into the switching chamber 15, whereby the membrane 11 is pressed against the membrane resting point 12 such that the pressure medium supply connection 13 is closed off. The same pressure also has an effect in the control pressure chamber 35 through the tube 43 and the entrance opening 45 in the closing lid 36. This pressure holds the conversion membrane 31 on the membrane seal 32 so that the pressure medium intake 33 likewise remains closed. If now the bistable conversion device 50 is dislocated from the illustrated position so as to produce a connection along the arrow in the upper field from the control pressure line 38 into the tube 52 and thereby to the outside, pressure medium will then flow out of the control pressure chamber 35 to the outside through the check valve 54 and the tube 57. When this happens, the membrane 31 separates from the membrane seal 32 and a connection is produced from the control medium intake 33 to the control medium exhaust 34. Pressure medium flows through the control medium line 20 and the opened membrane conversion valve 30 to the outside. By this current, pressure medium in the tubes 42 and 43 and the connecting control pressure chamber 35 and switching chamber 15 is sucked away through the exit opening 41 of the jet pump 40. Through this sucking action of the jet pump 40, low pressure is generated through tubes 42 and 43, in the control pressure chamber 35 and in the switching chamber 15. Thus, the simultaneous action of the high pressure of the pressure medium from the pressure medium supply connection 13 and the low pressure in the switch-off chamber 15 causes a very rapid separation of the membrane 11 from the membrane resting point 12. At the same time the opening movement of the membrane 31 in the membrane conversion valve 30 is accelerated and brought into a stable open position. The rapid opening movement of the switching membrane 11 in the membrane channel-valve 10 produces a pulse in the pressure medium into the pressure medium exhaust connection 14 and thus also in the connected user 60.

As long as the conversion membrane 31 in the membrane conversion valve 30 remains open, the low pressure generated by the jet pump 40 also has an effect in the switching chamber 15 and the control pressure chamber 35 so that both membranes 31 and 11 are held in the open position. By converting the bistable conversion device back into the illustrated position in which the connection from the tube 51 into the control pressure line 38 is made, the presence of a control pressure Ps from the tube 56 through the check valve 53, the tube 51, the conversion device 50 and the control pressure line 38 causes the conversion membrane 31 to come to rest against the membrane seal 32. In this way, the switching pressure medium in the control medium line 20 is converted from dynamic flow to static pressure. This static pressure exerts an effect through the jet pump 40 and the tube 43 into control pressure chamber 35 and supports the closing function of the conversion membrane 31 which acts through control pressure line 38. At the same time, this static pressure acts through the tube 42 into the switching chamber 15, whereby the switching membrane 11 is moved to the membrane resting point 12. Accordingly, the pressure medium flow from the supply connection 13 into the pressure medium exhaust connection 14 is interrupted. When the control pressure Ps is then no longer effective, the membranes 11 and 31 remain on the membrane resting point 12 and the membrane seal 32, since the static pressure in the control medium line 20 continues to affect these membranes through the tubes 42 and 43 because the check valve 53 prevents this control pressure from escaping from the control pressure chamber 35. In this way, definite, stable switching positions result. In addition, the switching movements of the two membranes 11 and 31 are advantageously supported owing to the double function of the jet pump 40 with the connecting tubes 42 and 43 leading to the chambers 15 and 35, respectively.

Figure 2:
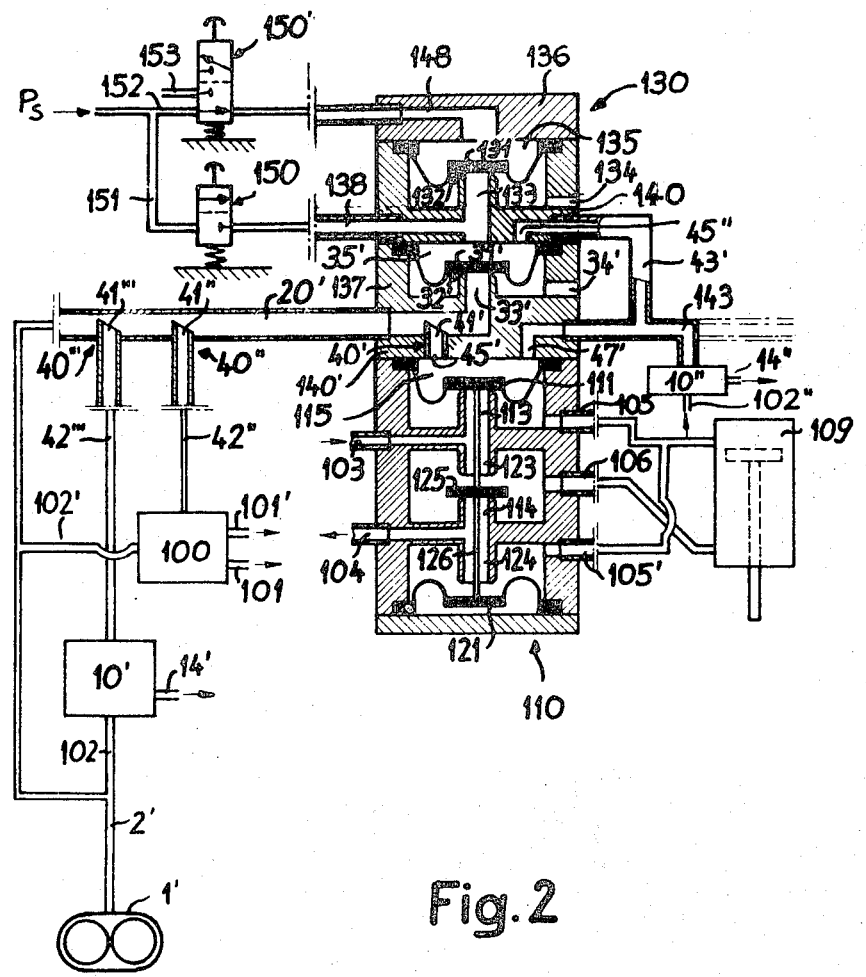
FIG. 2 shows a second variant model with several channel-valves in different switching arrangements.

FIG. 2 illustrates an extension of the concept underlying the invention. A pressure line 2' connects to a pressure generator 1'. From this line a control medium line 20' branches off and is connected through pressure lines 102, 102', and 102'' with membrane channel-valves 10', 100, and 10''. Thus, the channel-valves 10' and 10'' with their exhaust connections 14' and 14'' correspond in all essential features to the channel-valve 10 illustrated in FIG. 1. By contrast, the membrane channel-valve 100 has two user connections 101 and 101' which can be used alternately. The action of this valve corresponds largely to that of the 4/2 channel-valve 110 to be described below.

In the control medium line 20' two jet pumps 40'' and 40''' are installed, whereby the two exit openings 41'' and 41''' open in the control medium line 20'. From the exit openings, tubes 42'' and 42''' lead off to switching chambers (not shown) of the two channel-valves 10' and 100 just as in the membrane channel-valve 10 according to FIG. 1. The control medium line 20' is connected with a membrane conversion valve 130. The control medium line 20' has a connecting control medium intake 33' which terminates with a membrane seal 32' in the area of a conversion membrane 31'. Conversion membrane 31', membrane seal 32', and control medium intake 33' are arranged in a valve housing 137 which also has a control medium exhaust 34'. On the side of conversion membrane 31' which faces away from the membrane seal 32' a control pressure chamber 35' is formed against a dividing wall 140. Through the dividing wall 140 a control pressure line 138 leads into this control pressure chamber 35'. From the dividing wall 140 an additional membrane seal 132 extends into the area of an additional conversion membrane 131. At this membrane seal 132 is the opening of an additional control medium intake 133 which is connected to the control medium pressure line 138. The conversion membrane 131 and the accompanying membrane seal 132 with the control medium intake 133 are installed in the same housing 137. From the chamber formed by the housing 137, the conversion membrane 131, the membrane seal 132 and the dividing wall 140 an exit is provided by a control medium outlet 134. Facing away from the membrane seal 132, a second control pressure chamber or control space 135 is closed off by the conversion membrane 131 and a covering valve lid 136. An additional control pressure line 148 leads into this second chamber. The control pressure lines 138 and 148 respectively contain an impulse generator 150 and 150', which, in turn, are connected to a pressure source Ps via tubes 151 and 152.

The bistable membrane conversion valve 130 which, in contrast to FIG. 1, is provided with two membranes 31' and 131, directly mounts a 4/2 channel-valve 110 in the manner of a membrane channel-valve. A wall 140' of valve 130 closes this membrane channel-valve 110 off above an uppermost membrane 111 and delimits a switching chamber 115. A jet pump 40' leads into this switching chamber 115 from the control medium line 20' and passes through the dividing wall 140'. The exit opening 41' of this jet pump 40' is located inside the control medium line 20', while the entrance opening 45' is located in the area of the switching chamber 115. Between the switching membrane 111 and an additional membrane 121 in this membrane channel-valve 110 there extends a mechanical plunger 126, on which a valve disc 125 is fastened between the two membranes 111 and 121. In the direction of the switching membrane 111, a control medium supply connection 113 connects to a pressure medium supply line 103 and, in the direction of the valve disc 125, there is a connection with a supply connection 123. From an outflow connection 124 in the area of the additional membrane 121 and from an outflow connection 114 in the area of the valve disc 125 there are channels leading to a pressure medium outlet 104.

A pressure medium line 105 leads from the chamber containing the switching membrane 111. A pressure medium line 106 leads from the chamber containing the valve disc 125. A connection 105' which interconnects with the connection 105 leads from the chamber containing the additional membrane 121. The connections 105 and 106 are connected with the ends of a pressure medium user 109, e.g., a cylinder-piston combination.

The mouth 47' of a tube 43' is directed into the switching chamber 115. The tube 43' leads to an entrance opening 45'' in the membrane conversion valve 130 which opening leads to the control pressure chamber 35'.

A switching line 143 leading to a switching chamber (not shown) of another channel-valve 10'' can be connected to the tube 43'. Indicated by a dotted line are possible connections to the tube 143 for additional membrane channel-valves.

In the position shown for the impulse generators 150 and 150' and with the pressure generator 1' engaged and a control pressure Ps present in the tubes 151 and 152, the illustrated positions of the membranes in the valves 130, 110 and correspondingly also 10', 100, 10'' result. In the user 109, the piston is moved upward by means of the pressure coming from the tube 103 through the open pressure medium supply connection 123 and the user tube 106. The amount of pressure medium thereby displaced enters the outflow line 104 via the tube connection 105' and the pressure medium outflow connection 124. If by activating the impulse generator 150' an impulse is provided so as to produce a connection from the control pressure line 148 into the outflow connection 153 corresponding to the arrow on the drawing, the pressure in the control pressure chamber 135 will collapse and the conversion membrane 131 moves away from the membrane seal 132 so as to produce a connection from the control medium inlet 133 into the control medium outlet 134. Pressure medium thus flows out of the control pressure chamber 35' and the conversion membrane 31' moves away from the membrane seal 32'. The static pressure present in the control medium line 20' thus changes suddenly to a pressure medium current through the control medium inlet 33' to the control medium outlet 34'. Accordingly, in the jet pumps 40', 40'', and 40''' pressure medium is sucked from the tubes 42'' and 42''' as well as from the pressure chamber 115 and the corresponding switching chambers in the channel-valves 10', 100, 10''. In these tubes 42'', 42''' and in the connected switching chambers of the channel-valves, low pressures arise. The low pressure in the switching chamber 115 is likewise generated in the tube 43' and thereby in the control pressure chamber 35'. Since the impulse generator 150' produces only a brief connection from the control pressure line 148 into the outflow connection 153, whereupon the connection between the tube 152 and the control pressure line 148 is soon reestablished, the conversion membrane 131 immediately moves back against the membrane seal 132 and the control medium inlet 133 is sealed. In the case of the impulse generator 150, the control pressure line 138 remains closed off. Hence the low pressure in the control pressure chamber 35', generated by the jet pump 40', is maintained. The generated low pressure causes an accelerated separation of the conversion membrane 31'. However, the low pressure generated in the switching chamber 115 similarly causes the switching membrane 111 to lift and, by means of the plunger 126, the valve disc 125 and the additional membrane 121 are caused to move in the same direction. In so doing, the valve disc 125 moves onto the pressure medium supply connection 123 and the additional membrane 121 moves onto the pressure medium outflow connection 124, while at the same time the outflow 114 is released. Thus, this conversion of the 4/2 channel-valve 110 causes a pressure pulse at user 109 from the tube 103 via the supply connection 113 and the tube 105, while the chamber of the user 109 located before the movement of the piston is connected to the outflow line 104 via the connection 106 and the outflow connection 114. In the same manner, the jet-pump action of the jet pump 40'' exerts an effect on the 3/2 channel-valve 100. The connections 101 and 101' of this valve correspond in all essential points to the connections 105 and 106 of the 4/2 channel-valve. This 3/2 channel-valve, however, has only two membranes which approximately correspond to the membranes 111 and 125 of the 4/2 channel-valve 110.

The low pressure generated by the jet pump 40' in the switching chamber 115 can likewise be utilized for control purposes in additional membrane channel-valves, as is shown by the example with the tube 143 connecting to the tube 43' and the membrane channel-valve 10''. In this case, the membrane channel-valve 10'' may be analogous to the membrane channel-valve shown in FIG. 1.

As soon as the impulse generator 150 is activated, the control pressure medium moves from the tube 151 into the control pressure line 138, and from there into the control pressure chamber 35'. This control pressure opposes the generated low pressure and closes the conversion membrane 31' on the membrane seal 32'. The control medium flowing in the control medium line 20' is stopped. This control medium suddenly begins to act as static pressure through the jet pumps 40', 40'', and 40''' in the switching chamber 115, also in the control pressure chamber 35' via the tube 43', and also in the membrane channel-valve 10' and in the 3/2 channel-valve 100 via the tubes 42' and 42''. This static pressure also exerts an effect in the membrane channel-valve 10'' via the tube 143 from the tube 43'. In this way, the switching membranes located in the corresponding chambers of the channel-valves, just as the switching membrane 111 of the 4/2 channel-valve shown in section, receive a pulse from this high pressure and are accordingly moved against a membrane resting point. This causes a switching function of the connected user. In the present example, the piston of the user 109 is again moved downwards. As long as the conversion membrane 31' covers the membrane seal 32', there is a static pressure in the control medium line 20' and thus in all the jet pumps 40', 40'', 40''' provided therein. This static pressure remains effective in all the membrane channel-valves 10', 100, 110, 10'' thereby controlled and also in the control pressure chamber 35' of the membrane conversion valve 130. Only when the impulse generator 150' is activated, thus lifting the conversion membrane 131 off the membrane seal 132, is a new switching function initiated, such that the static pressure is converted to low pressure by the flow of the control medium in the control medium line 20'.

Figure 3:
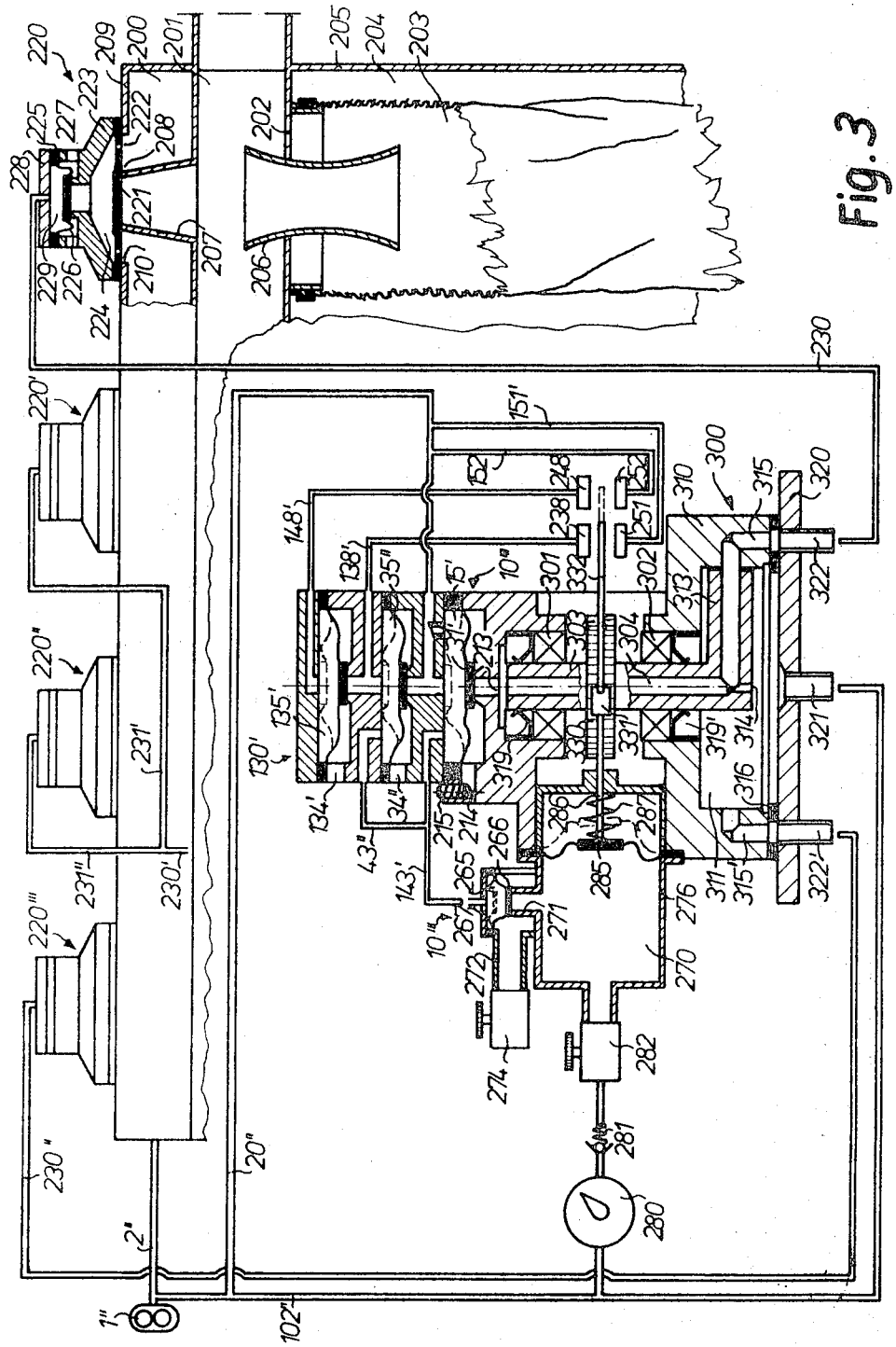
FIG. 3 discloses a third variant model that utilizes the valves of FIGS. 1 and 2. A pressure medium line 2 connects with a gas pressure generator 1, e.g., a blower. The pressure medium line 2 leads to a membrane channel-valve 10. In this membrane channel-valve 10 there is installed a membrane 11. A membrane resting point 12 faces a pressure medium supply connection 13 and on the same side of membrane 11 an outflow connection 14 for a user 60 (not illustrated) is provided in a housing 17. On the other side of membrane 11 a switching chamber 15 is sealed off between the membrane 11 and a lid 16 placed on top of the housing 17.

In FIG. 3 we have a third model-variant which represent a combined application of a 2/1 channel-valve according to FIG. 1 with a two-membrane flip-flop according to FIG. 2 as well as a distributor control, connected to the 2/1 channel-valve, which is located in a gas-dedusting device having several hoselike or pocket-like filter mechanisms, at which clean air jet devices are directed. The two-membrane flip-flop 130' corresponds in design and function to the piece 130 according to FIG. 2 and is similarly surmounted on a channel-valve, as illustrated in FIG. 2. This channel-valve 10''', however, corresponds to the design 10 in FIG. 1. In this case, a cross-section changing screw 215 is installed in the outflow opening 214. A gas pressure generator 1'', e.g., a fan, has a connecting pressure medium line 2'' which opens into a pressure medium container 200. The pressure medium container 200 forms the cover of a clean air chamber 201, thereby closing it off. Approximately parallel to the pressure medium container 200, this clean air chamber 201 is delimited by a dividing wall 202. At the dividing wall 202, filter-hoses or filter-pockets 203 are inserted inside a dusty air space 204 which is delimited by a housing 205. Opening into the dividing wall 202 and the hose or pocket-like filter mechanism 203 there is a flow mechanism 206 which is preferably designed in the manner of a venturi jet. Mounted with free play axially to the flow mechanism 206 a steel tube 207 crosses the pressure medium container 200. Between the opening 208 (on the side toward the entrance) of the steel tube 207 and a cover plate 209 of the pressure medium container 200 several individual passage openings 210 or a ring-shaped opening of this kind are left free. Above the passage opening 210 and the entrance opening 208 of the steel tube 207 a cleaning jet valve is surmounted. Opposite the entrance opening 208 it encompasses a switching membrane 221 which has at least one flow opening 222 in the area of the passage opening 210. Between the switching membrane 221 and a housing 223 surmounted on its rim is a switching chamber 224. The switching chamber 224 is closed off by a switching membrane 225 in a chamber 226. An outflow opening 227 leads out of the chamber 226. Opposite the switching chamber 224, a control chamber 229 is delimited by a lid 228 and the switching membrane 225. Through the lid 228, a switching pressure line 230 opens into the control chamber 229. Associated with each filter-hose or filter-pocket 203 installed in the dusty air chamber 204 is a similar cleaning valve 220', 220'', 220'''. If desired, more than one cleaning valve 220', 220'' can also be connected to a switching pressure line 230' by means of branch lines 231' and 231'', if several filter mechanisms are to be cleaned at the same time.

The pressure medium line 2'' has a connecting control pressure medium line 102'''. From this, a control medium line 20'' leads away to the two-membrane flip-flop 130', just as was described with reference to FIG. 2. In this control medium line 20'', just as in FIGS. 1 and 2, a jet pump is installed such that thereby the switching chamber 15' of the channel-valve communicates with the control medium line 20''. A tube 43'' also leads from the switching chamber 15' into the control pressure chamber 35'' of the two-membrane flip-flop 130'. As already indicated in FIG. 2, the tube 43'' connects with an additional tube 143' which opens into a switching chamber 264 of an additional channel-valve 10'''. A membrane 266 closes off this switching chamber 265 in addition to lid 267. This channel-valve 10''' is surmounted on a branch pipe 271 of a pressure chamber 270. A tubular piece 272 connects the channel-valve 10''' with a jet timing throttle 274.

The pressure chamber 270 is connected with the control pressure line 102''' via an intervening in-out valve 280, a check valve 281 and a cadence throttle 282. A membrane 285 attached in the pressure chamber 270 divides this chamber into two sub-spaces. The membrane 285 has a connecting plunger 286 and there is a spring 287 between the membrane and the housing 276 of the pressure chamber 270.

The 2/1 channel-valve 10''' surmounts a distributor control 300. The latter contains an axle 303 with a borehole 304 rotatably mounted on bearings 301 and 302. In a chamber 311 formed in the housing 310 of the distributor control 300, the rotatable axle 303 connects with an arm 313 which projects toward the outside. The borehole 304 continues in this arm 313 and exits from the arm. Relative to the inner limit of the chamber 311 the arm 313 is movable. In arm 313 there is an opening 314 which leads from the chamber 311 in the borehole 304. Preferably, this opening is provided in axial extension to the borehole 304 in the rotatable axle 303, the cross-sectional surface of which is small relative to the borehole surface 304. In the housing 310, a number of connecting boreholes 315, 315' corresponding to the number of clean air valves or groups of clean air valves to be controlled are provided and distributed over the circumference. Beyond seal 316, which is provided with passages corresponding to the connecting boreholes 315, the distributor chamber 311 is delimited by a connecting plate 320. In the connecting plate 320, a control pressure medium connection 321 is provided and also a number of connections 322, 322' for the switching lines 230, 230', which number corresponds to the number of clean air valves or groups of clean air valves to be controlled.

In the area of the plunger 286 a ratchet wheel 330 is attached to the swivel axle 303. The ratchet wheel 330 works with a switching pawl 331 which is operated by the plunger 286. A jet plate 332 projects from this pawl.

In the area of this jet plate 332, jet emission and receiving combinations are provided such that two jet emitters 251 and 252 are provided and connected with the control medium line 20" by means of tubes 151' and 152'. At a distance from the jet emitters 251 and 252 are jet receivers 238 and 248, connected with the control pressure lines 138' and 148', which lead into the control chambers 35" and 135' of the two-membrane flip-flop 130'.

Between the swivel axle 303 and the channel-valve 10''' on the one hand, and the distributor chamber 311 on the other, seals 319 and 319' are installed.

The manner in which the combination of channel-valve 10''' with two-membrane flip-flop 130' operates corresponds to that explained for FIGS. 1 and 2, where the operation of the control of the channel-valve 10''' is also elucidated. There remains only a brief explanation of the actual control of the two-membrane flip-flop by means of the emission-receiving combinations 251–238 and 252 – 248 depending on the movement of the jet-plate 332. The pressure generator 1" is in operation and conveys pressure medium into the pressure container 200 and, when valve 280 is open, pressure medium is conveyed via the control pressure line 102''' into pressure chamber 270. As the pressure chamber 270 fills, the membrane 285 moves to the right. The pawl 331 thus carries the ratchet wheel 330 along and turns along with the swivel axle 303. The arm 313 is moved from a connecting borehole 315 to an adjacent connecting borehole in the housing of the distributor device 300. Synchronically with this movement, the jet-plate 332 is moved between the emission-receiving pair 251 – 238 and, after that, 252 – 248. The instant the jet from the tube 152' into the control pressure line 148' is interrupted, the pressure in the control pressure chamber 135' vanishes and the membrane located there releases a connection from the control pressure chamber 35" into the control medium outlet 134'. Simultaneously the static pressure built up by the control medium line 20" through the jet pump in the switching chamber 15' collapses through tube 43". The membrane in switching chamber 35" is lifted off due to the pressure out of control line 20" and the connection to the control medium outlet 34" is thereby opened. By means of the jet pump, a low pressure is generated in the switching chamber 15' and in the control pressure chamber 35". Simultaneously, this low pressure is also generated in the chamber 265 of the channel-valve 10''', so that the channel-membrane 266 separates from the opening 271 and opens a connection from the pressure chamber 270 into the tubular piece 272 to the pulse-time throttle 274, and from here to the outside. The pressure in the chamber 270 collapses, whereby the adjustment of the pulse-time throttle 274 determines the rate at which the pressure degenerates. Spring 287 moves the membrane 285 away from the housing 276 in the area of the plunger 286. When the low pressure is generated in the switching chamber 15', the membrane 31' is separated from the opening 213.

Pressure medium which was amassed from the chamber 311 in the distributor device 300 through the switching tube 230 into the chamber 229 above the switching membrane 225, now flows to the outside from opening 213 past the separated membrane 31' and the outlet opening 214 with screw 215 adjusted therein. By proper adjustment of the size of the opening 314 from the chamber 311 into the borehole 304, only very little pressure medium escapes from the chamber 311 so that all further clean air valves remain securely closed via the switching lines which lead from chamber 311. Correspondingly, the membrane 225 separates from the switching chamber 224, so that the pressure medium which flowed into the switching chamber 224 through the openings 222, flows away through the outlet opening 227. The membrane 221 opens abruptly and pressure medium flows from the pressure medium container 200 through the opening 210 into the cleaning tube 207 and from there through the current element 206, whence it enters the filter hose as an abrupt pulse of clean air, thus removing the adhering dust from the surface of the hose.

The instant the channel-valve 10''' opens, thus releasing pressure medium from the pressure chamber 270, the membrane 285 moves again in the direction of the pressure medium inlet which opens from the switching pressure lines 102''''. This immediately establishes the connection from the emitter 252 to the receiver 248, whereby pressure medium is conveyed into the control chamber 135' by means of the inflowing control medium from the tube 20" through the tube 152' and the tube 148'. In this way, the membrane is finally laid over the switching chamber 35". Depending on the rate at which pressure medium flows out of the pressure chamber 270, the membrane 285 moves at a certain rate in the direction of the cadence throttle 282. During this time, control medium flows from the control medium line 20" through the two-membrane flip-flop 130' to the outflow opening 34". Also during this time, the jet pump effect maintains a low pressure in the switching chamber 15' and the control chamber 35" as well as the chamber 265. Only when the jet-plate 332 also opens the connection from the emitter 251 to the emitter 238 does control medium flow from the tube 151' through the tube 138' into the control chamber 35", there causing a pressure counter to the prevailing low pressure such that the membrane provided there closes off the entering control medium line 20". Immediately, the current through the jet pump ceases, the static pressure in the tube 20" builds up in the switching chamber 15' and moves the membrane 31' into the opening 213. Accordingly, the connection from the opening 213 through the borehole 304 and the switching line 230 into the chamber 229 is closed off on both sides. Control pressure medium flows from the distributor chamber 311 through the opening 314 into the borehole and thereby also into the chamber 229, where the membrane 226 is moved onto the opening from the switching chamber 224. Through the openings 222, pressure medium from the pressure medium container 200 fills the switching chamber 224, whereby the membrane 221 is also moved onto the opening 208 at the cleaning tube 207, thus terminating the cleaning pulse. These switching phases follow one another very quickly. At the same time, this high pressure also causes the opening 271 to be closed by the membrane 266. With this, the pressure chamber 270 again begins to charge with pressure medium from the switching pressure line 102'''. When the membrane 285 is again dislocated, the ratchet wheel 330 is turned by means of the pawl 331, pressure medium leaves the distributor chamber 311 and passes through the connection opening 315 which was opened by the movement of the arm 313, and enters the switching chamber 229, whereby the membrane 225 is held on the opening of the switching chamber 224. Next, another cleaning valve 220''' or a combination of cleaning valves 220' and 220'' is activated.

The third sample model thus presents an especially effective application of the invention-constituting device for performing the invention-constituting procedure. In contrast with known devices, large amounts of cleaning-air can thus be managed in a controlled fashion in a gas-cleaning device through the use of considerably simplified means.

What is claimed is:

1. The method of controlling a membrane channel-valve having a switching chamber which comprises the steps of supplying a first pressure of one sense to said chamber to close the valve, and supplying a second pressure of opposite sense to the chamber to open the valve.

2. The method of claim 1 in which the first and second pressures are derived by closing and opening a control medium line to give it a first condition in which the medium in the line is static and a second condition in which the medium flows as a current.

3. The method of claim 2 in which the current of the medium is used to create the pressure of opposite sense.

4. Control apparatus, comprising:
   a. at least a first membrane channel-valve (10) for pressure medium, having a housing carrying at least one switching membrane (11), said housing having a pressure medium supply connection (13) with a membrane resting point (12) and a pressure medium outflow connection (14) located on one side of said membrane, and having a switching chamber (15) located on the other side of said membrane;
   b. a conversion valve (30) for controlling said channel-valve (10), said conversion valve having a control medium inlet (33), a control medium outlet (34), and control means (31) for preventing and permitting flow between said inlet and said outlet;
   c. a control medium line (20) leading to the control medium inlet (33) of said conversion valve; and
   d. a jet pump (40) having an exit opening (41) connected in the control medium line (20) and an entrance opening (47) located in said switching chamber (15) of the membrane channel-valve (10), whereby a static pressure is created in said switching chamber (15) when said control medium is prevented from flowing to said control medium outlet (34), and a low pressure is created in said switching chamber (15) by said jet pump (40) when said control medium is permitted to flow to said control medium outlet (34).

5. Apparatus according to claim 4 comprising a plurality of membrane channel-valves, and a plurality of jet pumps having exit openings connected in the control medium line, and entrance openings located in switching chambers of the membrane channel-valves.

6. Apparatus according to claim 4 wherein additional switching chambers of additional membrane channel-valves are connected via pressure medium lines (143) to the switching chamber (115) of the first membrane channel-valve (110) and with the entrance opening of the jet pump (40').

7. Apparatus according to claim 4 wherein a membrane conversion valve is used as the conversion valve, said membrane conversion valve having a housing carrying at least one conversion membrane (31), said housing having a control medium inlet (33) with a membrane resting point (32) and a control medium oulet (34) located on one side of said membrane and having a control pressure chamber (35) located on the other side of said membrane which has a control pressure line (38) opening into it.

8. Apparatus according to claim 7 wherein the membrane conversion valve (130) directly surmounts the membrane channel-valve (110) and delimits the switching chamber (115) opposite the switching membrane (111), wherein the control medium line (20') is formed in a dividing wall (140') between the two valves (110,130) and wherein the jet pump (40') leads from the control medium line (20') through the dividing wall (140') into the switching chamber (115).

9. Apparatus according to claim 7 wherein a conversion device (50) is provided in the control pressure line (38).

10. Apparatus according to claim 9 wherein the conversion device is a 3/2 channel-valve providing two switchable flow channels.

11. Apparatus according to claim 10 wherein means (53, 54) are provided for limiting the two switchable flow channels through the 3/2 channel-valve to a single direction of flow.

12. Apparatus according to claim 7 wherein a second conversion membrane (131) in the membrane conversion valve (130) is provided, one side of which faces a control seat (132) between the control pressure chamber (35') and an outflow opening (134) and the other side of which faces a control space (135) with an entering control line (148).

13. Apparatus according to claim 12 wherein an impulse generator (150, 150') is provided in both the control pressure line (138) and in the control line (148).

14. Apparatus according to claim 7 wherein an additional entrance opening (45) connected with the jet pump (40) opens into the control pressure chamber (35) of the membrane conversion valve (30) associated with the membrane channel-valve (10).

15. Apparatus according to claim 7 wherein the control pressure chamber (35) of the membrane conversion valve (30) is connected with the switching chamber (15) in the membrane channel-valve (10).

* * * * *